(12) United States Patent
Cogordan et al.

(10) Patent No.: US 7,718,731 B2
(45) Date of Patent: May 18, 2010

(54) AQUEOUS DISPERSION OF ALKYDE RESIN WHICH IS TREATED WITH AN OXIDIZING AGENT AND WHICH HAS IMPROVED DRYING PROPERTIES

(75) Inventors: Frank Cogordan, Creil (FR); Ivan Rodriguez, Cauffry (FR)

(73) Assignee: Cray Valley SA, Courbevoie (FR)

( * ) Notice: Subject to any disclaimer, the term of this patent is extended or adjusted under 35 U.S.C. 154(b) by 1203 days.

(21) Appl. No.: 10/543,642

(22) PCT Filed: Jan. 27, 2004

(86) PCT No.: PCT/FR2004/000185

§ 371 (c)(1),
(2), (4) Date: Jul. 28, 2005

(87) PCT Pub. No.: WO2004/069933

PCT Pub. Date: Aug. 19, 2004

(65) Prior Publication Data

US 2006/0100316 A1 May 11, 2006

(30) Foreign Application Priority Data

Jan. 31, 2003 (FR) .................................. 03 01130

(51) Int. Cl.
*B29C 41/00* (2006.01)
(52) U.S. Cl. ..................................................... 524/878
(58) Field of Classification Search .................. 824/878
See application file for complete search history.

(56) References Cited

U.S. PATENT DOCUMENTS

| 2,981,703 | A | 4/1961 | Hoenel | 260/20 |
| 2,981,710 | A | 4/1961 | Hoenel | 260/29.3 |
| 3,222,308 | A | 12/1965 | Joo | 260/22 |
| 4,419,139 | A | 12/1983 | Gooch et al. | 106/252 |
| 6,225,485 | B1 * | 5/2001 | Bertz et al. | 554/148 |

* cited by examiner

*Primary Examiner*—Edward J Cain
(74) *Attorney, Agent, or Firm*—Whyte Hirschboeck Dudek SC

(57) ABSTRACT

The present invention relates to an aqueous dispersion of alkyd resin based on fatty acids possessing conjugated unsaturation which is treated with an oxidizing agent and which has a specific performance, in particular on drying, to a specific production process and to its use as binder in aqueous compositions for decorative or industrial coatings with a reduced level of drying agent or without drying agent.

The aqueous dispersion comprises at least one alkyd resin, obtained from at least one unsaturated fatty acid having a level by weight of at least 5% of the said resin, which resin is treated, before and/or during and/or after the forming of the aqueous dispersion, with at least one oxidizing agent selected from: hydroperoxides, including $H_2O_2$, peroxides or singlet oxygen, and with the oxidizing treatment temperature being:
i) from ambient temperature to less than 100° C., when it takes place after the forming of the dispersion, and
ii) from 50 to 150° C., when it takes place before the forming of the dispersion, and
iii) from 50 to less than 100° C., when it takes place during the dispersion stage.

37 Claims, No Drawings

AQUEOUS DISPERSION OF ALKYDE RESIN WHICH IS TREATED WITH AN OXIDIZING AGENT AND WHICH HAS IMPROVED DRYING PROPERTIES

The present invention relates to an aqueous dispersion of alkyd resin based on fatty acids possessing conjugated unsaturation which is treated with an oxidizing agent and which has a specific performance, in particular on drying, to a specific production process and to its use as binder in aqueous compositions for decorative or industrial coatings with a reduced level of drying agent or without drying agent.

The drying of a film of a paint formulated from an alkyd resin takes place by autoxidation with atmospheric oxygen. One of the objects of this invention is the acceleration of the drying of films of formulated paint based on a specific alkyd resin by specific treatment with oxidizing agents, before and/or during and/or after the forming of the aqueous dispersion.

U.S. Pat. No. 3,222,308 discloses an oxidizing pretreatment with atmospheric oxygen of alkyd resins in a solvent medium with resulting treatment times and drying times excessively long, even for high temperatures treatment. Moreover, this document specifies that the risk of gelling limits the use of higher temperatures. This gelling is indeed confirmed under the conditions described in U.S. Pat. No. 3,222,308 with regard to an alkyd resin possessing conjugated unsaturation, which excludes the possibility of extrapolating the teaching of U.S. Pat. No. 3,222,308 to the solution of the problem of the present invention.

U.S. Pat. No. 2,981,703 discloses alkyd resins in a solvent medium which are treated with $H_2O_2$ for their use as plasticizers in aminoplast-based aqueous varnishes, in order to improve their compatibility with the other components.

The technical problem which the present invention has solved, with respect to the prior art, lies in a compromise in performance aspects which is not obvious with respect to the state of the art, such as significantly improved drying, with the consequence of the possibility of significantly reducing and preferably dispensing with drying agents, without negative effects on the stability and the other performance aspects of the aqueous dispersion of the specific alkyd resin possessing conjugated unsaturation. The specificity of the oxidizing treatment and of the treated resin makes it possible to significantly reduce and preferably to dispense with the need for the presence of drying agents, while avoiding the destabilization of the dispersion or the gelling of the resin, this being the case despite the presence of conjugated unsaturation. The performance of the resin treated according to the conditions disclosed in U.S. Pat. No. 2,981,703 is shown to be inadequate, in particular on drying, and, furthermore, their extrapolation to a resin according to the present invention results in gelling. Consequently, the technical teaching of the state of the art cannot be applied to the problem of the present invention.

The present invention, by a specific choice of the processing conditions applied to the specific resin possessing a high level of conjugated unsaturation, overcomes the disadvantages related to the technical problem described and makes it possible to obtain aqueous dispersions of alkyd resins having significantly improved drying performances. The improvement is expressed in particular in terms of drying time and storage performance (stability over time) or of application and of dilutability in water (stability by dilution in water) and of observing the environmental regulations with reduced levels of volatile organic compounds or of heavy metal compounds used as drying agents, while keeping at least constant other performance aspects (e.g.: gloss, yellowing) of these coatings with respect to the absence of treatment and while preventing the problem of gelling of the treated alkyd resin or that of the risk of the flocculation of the dispersion by interparticle crosslinking, a more particular risk for resins having a significant level of conjugated unsaturated fatty acid. It involves a complex and difficult compromise of several applicational and operational performance aspects which the invention has succeeded in obtaining by the specific means used for the resin and for the process.

A first subject-matter of the present invention relates to an aqueous dispersion of at least one alkyd resin subjected to an oxidizing treatment, before and/or during and/or after forming the aqueous dispersion, by a specific oxidizing agent and at a specific temperature, which depends on the performing of the treatment with respect to the stage of forming the aqueous dispersion.

A second subject-matter of the present invention relates to a process for the preparation of this aqueous dispersion comprising a stage of treatment by at least one specific oxidizing agent, and a stage of aqueous dispersion of the alkyd resin, before or during or after the oxidizing treatment.

Another subject-matter of the invention is an alkyd resin dispersion which can be obtained according to the specific process of the invention.

An aqueous coating composition from decorative or industrial aqueous paints or varnishes comprising, as binder, at least one aqueous alkyd resin dispersion according to the invention and more preferably without drying agent also forms part of the invention.

Another subject-matter of the invention is the use of an aqueous dispersion according to the invention in decorative or industrial aqueous coatings, including corrosion-resistant coatings, for substrates selected from: wood, metal, plastic, concrete, plaster, ceramic, brick or composite.

Finally, a last subject-matter relates to substrates coated with at least one of the coating compositions as defined according to the invention.

The first subject-matter of the present invention relates to an aqueous dispersion comprising at least one alkyd resin obtained from at least one conjugated unsaturated fatty acid representing, by weight, at least 5% of the said resin, the said resin being treated, before and/or during and/or after forming the aqueous dispersion, with at least one oxidizing agent selected from: hydroperoxides, including $H_2O_2$, peroxides or singlet oxygen, and the temperature of the oxidizing treatment being: i) from 50 to 150° C., preferably from 50 to 140° C., and more preferably from 70 to 120° C., and more preferably still of 70 less than 100° C., when it takes place before forming the dispersion, and ii) from ambient temperature to less than 100° C., preferably from 50 to 90° C., when it takes place after forming the dispersion, and iii) from 50 to less than 100° C. and preferably from 50 to 90° C., when the treatment takes place during the dispersion stage.

The duration of the oxidizing treatment can vary, depending on the nature and the level of the oxidizing agent and on the treatment temperature, from a few minutes, such as 5 minutes (at the highest temperature and at the highest level of oxidizing agent), to a few hours, such as 5 hours (at the lowest level and at the lowest temperature).

According to a more preferred form of the dispersion according to the invention, the oxidizing treatment can take place in the absence of any drying agent or of any agent which may play an equivalent role of reducing agent, which can facilitate the decomposition of the oxidizing agent, such as hydroperoxide or peroxide.

The oxidizing agent is more preferably selected from hydroperoxides of general formula ROOH, with R chosen from H, alkyls or aralkyls, and with a level by weight ranging from 0.05 to 5% with respect to the total of the said resin. In this case, the treatment time can vary from 5 minutes to 5 hours and preferably to 2 hours.

More particularly, the hydroperoxide can be chosen from: $H_2O_2$, cumyl hydroperoxide or t-butyl hydroperoxide, and more preferably aqueous $H_2O_2$. In the latter case, $H_2O_2$ is in the form of an aqueous solution with a level by weight of $H_2O_2$ ranging from 15 to 60% and more particularly from 25 to 45%. The level by weight of $H_2O_2$, expressed as % pure $H_2O_2$/resin, can vary within the range from 0.05 to 5% and preferably from 0.05 to 2%, and more preferably from 0.05 to 1.5% and more preferably still of 0.1 to 1%. In the case of $H_2O_2$, the duration of the treatment can vary from 5 minutes to 2 hours and preferably from 10 minutes to 1 hour.

The aqueous dispersion according to the invention can preferably have a level by weight of conjugated unsaturated fatty acid ranging from 10 to 60% and preferably from 15 to 50%, and more preferably from 20 to 50%, with respect to the said resin and a total level by weight of fatty acid of 30 to 70% by weight, and preferably from 30 to 60%, with respect to the said resin, with a level by weight of conjugated unsaturated fatty acid with regard to the fatty acid total ranging from 15 to 85% and preferably from 25 to 70%, and more preferably from 35 to 70%.

The aqueous dispersion of the invention preferably has a mean particle size ranging from 50 to 500 nm and preferably from 100 to 300 nm, and a solids content ranging from 30 to 70%, preferably from 40 to 60%.

The alkyd resin according to the invention can have the following additional characteristics before the oxidizing treatment: a weight-average molecular mass Mw ranging from 10 000 to 500 000 and preferably from 20 000 to 300 000 and an acid number not exceeding 70, preferably 5 to 60, and more preferably from 5 to 50, an OH number ranging from 20 to 150, and preferably from 30 to 100, and a mean functionality f ranging from 1.9 to 2.1. This mean functionality is defined as being equal to (cf. The Chemistry of Organic Film Formers, John Wiley & Sons Edition, p. 80, D. H. Solomon):

$$f = 2\Sigma i\, n_i f_i / M$$

with $n_i$ and $f_i$ respectively being the number of moles and functionality of the (poly)acid and M the total number of moles.

The alkyd resin, before the oxidizing treatment, can be obtained by any conventional process for the manufacture of alkyd resins, either by the fusion process or by the solvent process, as described in Kirk-Othmer, Encyclopaedia of Chemical Technology (published by Wiley-Interscience on 14 Nov. 2000), Vol. 2, "Alkyd resins", pp. 12-14. One of the essential characteristics of this alkyd resin is the presence in the latter of at least one conjugated unsaturated fatty acid at a level by weight of at least 5%, preferably of at least 10% and more particularly of 10 to 60% and more preferably of 15 to 50%, and more preferably still of 20 to 50%. The total level by weight of the fatty acid (including the conjugated unsaturated fatty acid) in the resin varies from 30 to 70%, and preferably from 30 to 60%. It is possible to define, as conjugated unsaturated fatty acids, the unsaturated fatty acids comprising at least one conjugated diene unsaturation per fatty chain of —CH=CH—CH=CH— type. This conjugated diene unsaturation can exist naturally in unsaturated fatty acids, such as tung oil or oiticica oil, or by specific treatment, such as the isomerization of unsaturated fatty acids (non-conjugated dienes or unsaturated dienes in general). Suitable examples for the invention are the products from the isomerization of non-conjugated unsaturated fatty acids, such as: linoleic or linolenic acid or sunflower oil fatty acid, linseed oil fatty acid or soybean oil fatty acid, or the products from the dehydration of castor oil fatty acid. Mention may be made, as other conjugated fatty acids available commercially which may be suitable for the requirements of the invention, with a high level of conjugated fatty acids, of Nouracid® DE704, DE656, DE655, DE554, DE503, DZ453, DE402 (dehydrated castor oil fatty acid—Akzo-Nobel), Nouracid® HE456, HE305, HE304 (isomerized sunflower oil fatty acid—Akzo-Nobel), Nouracid® LE805 (isomerized linseed oil fatty acid—Akzo-Nobel), Prifac® 7967, 7968 (isomerized vegetal oil fatty acid—Uniqema), Dedico® 5981, 5983 (dehydrated castor oil fatty acid—Uniqema), Isomergin® SK, SY, SF (isomerized vegetable oil fatty acid—Hobum Harburger Fettchemie Brinkcman & Mergell GmbH), Pamolyn® 200, 300, 380 (isomerized linoleic acid—Eastman).

Mention may be made, among the preferred conjugated unsaturated fatty acids, of: Isomergin® Acid SF, Nouracid® HE305, Nouracid® DE656, Dedico® 5981.

The acid component from which the alkyd resin is obtained furthermore comprises, in addition to the conjugated unsaturated fatty acid, at least one other non-conjugated unsaturated fatty acid, at least one saturated fatty acid, at least one polycarboxylic acid or corresponding anhydride derivative and at least one non-fatty monocarboxylic acid, such as chosen from benzoic, butanoic, p-(tert-butyl) benzoic, caproic, caprylic, capric, propanoic, pentanoic, abietic or crotonic acid. Mention may be made, among fatty monoacids, of castor oil fatty acid, coconut oil fatty acid, cottonseed oil fatty acid, dehydrated castor oil fatty acid, soybean oil fatty acid, tall oil fatty acid, 2-ethylhexanoic acid, linoleic acid, linolenic acid, oleic acid, pelargonic acid or rosin acid.

The monocarboxylic acid has a role of limiting or terminating agent for the alkyd resin chain obtained by polycondensation of the acid component and of the polyol component. The polycarboxylic acid or corresponding anhydride preferably has a functionality of 2 to 4 with intermediate mean functionalities which can be obtained by mixing at least two polyacids. Mention may be made, among these polyacids of functionality 2, of the following acids or anhydrides: adipic, azelaic, fumaric, isophthalic, maleic, phthalic, succinic, sebacic or diglycolic. Examples of polyacid or polyanhydride of functionality 3 are citric acid, trimellitic acid and trimellitic anhydride and an example of a polyacid or polyanhydride of functionality 4 is pyromellitic anhydride.

Due to the natural origin of the unsaturated fatty acids generally used in alkyd resins, they are in fact mixtures comprising saturated fatty acids, non-conjugated unsaturated fatty acids and, according to the invention, conjugated diene fatty acids.

The polyol component is composed of polyols commonly used in alkyd resins and can comprise at least one polyol of functionality from at least two up to 6, such as: ethylene glycol, polyethylene glycol (Mw varying from 300 to 6 000), propylene glycol, 1,3-butylene diol, pentanediol, neopentyl glycol, hexanediol, diethylene glycol, dipropylene glycol, triethylene glycol, glycerol, trimethylolpropane, trimethylolethane, pentaerythritol or dipentaerythritol, sorbitol, methyl glucose and optionally a monoalcohol, such as butanol, pentanol, hexanol, isooctanol, ethoxyethanol or butyl carbitol. The monoalcohol can act, like the monoacid of the acid component, as chain limiting and terminating agent.

Furthermore, the alkyd resin which can be used for the dispersion according to the invention can be or can comprise, apart from an alkyd as defined above, a chemically modified alkyd resin chosen from: silicone alkyds, urethane alkyds or alkyd-acrylic hybrids. The alkyd dispersion as subject of the oxidizing treatment (treatment after aqueous dispersion) can also be a mixture of at least one aqueous dispersion of at least one alkyd resin as defined before treatment with another aqueous dispersion of alkyd resin or with an emulsion of acrylic, styrene-acrylic or vinyl type which is compatible or with an aqueous dispersion of polyurethane or of another polymer which is compatible with the untreated alkyd resin as defined above.

As regards the oxidizing treatment, the treatment temperature is suited to the medium to be treated (the resin before or during or after aqueous dispersion) so as to achieve a suitable viscosity. Thus, the oxidizing treatment temperature is:

from 50 to 150° C., preferably from 50 to 140° C., and more preferably from 70 to 120° C., and more preferably still of 70 less than 100° C., when the treatment is carried out on the resin before aqueous dispersion and after the final stage of preparation of the base alkyd resin, or from ambient temperature to less than 100° C. and preferably from 50 to 90° C., when the treatment takes place on the aqueous resin dispersion (after forming the dispersion), or from 50 to less than 100° C., preferably from 50 to 90° C., when the treatment takes place during the stage of forming the aqueous dispersion and more specifically before the phase inversion.

Among the oxidizing agents which can be used, hydroperoxides and peroxides are added to the medium of the treatment slowly and in the solution form. Singlet oxygen, another possible oxidizing agent, is introduced into the medium to be treated by preparation in situ by reaction of an aqueous $H_2O_2$ solution with sodium hypochlorite (NaOCl).

The oxidizing agent preferred for the oxidizing treatment is $H_2O_2$ in aqueous solution, at a concentration ranging from 15 to 60% and preferably from 25 to 45% by weight with respect to the aqueous solution, with a level by weight of 0.05 to 5% and preferably from 0.05 to 2%, and more preferably from 0.05 to 1.5%, and more preferably still of 0.1 to 1%, with respect to the alkyd resin, taking into consideration here the total weight of alkyd resin.

As regards the oxidizing treatment of the aqueous dispersion, four options exist in connection with the situation of this stage in the process for producing the aqueous dispersion of the invention: i) after forming the dispersion, ii) before the stage of forming the dispersion, iii) during the forming of the dispersion and more specifically before the stage of phase inversion, and iv) according to the combination of at least two options from the three preceding options i), ii) and iii).

According to the first option i), the aqueous dispersion is obtained by an oxidizing treatment after the stage of forming the aqueous dispersion of the said alkyd resin, at a treatment temperature of less than 100° C. and preferably ranging from ambient temperature to less than 100° C. and more preferably from 50 to 90° C.

According to the second option ii), the aqueous dispersion is obtained by an oxidizing treatment which takes place before the forming of the dispersion, that is to say directly on the alkyd resin, at a temperature ranging from 50 to 150° C., and preferably from 50 to 140° C., and more preferably from 70 to 120° C., and more preferably still of 70 less than 100° C.

According to the third option iii), the aqueous dispersion is obtained by an oxidizing treatment which takes place during the stage of the forming of the dispersion and more specifically before the stage of phase inversion, with the said oxidizing treatment taking place at a temperature ranging from 50 to less than 100° C. and preferably from 50 to 90° C.

According to the fourth option iv), the aqueous dispersion is obtained by an oxidizing treatment according to the combination of at least two options from the three preceding options i), ii) or iii). According to this combinative option iv), the oxidizing treatment can take place either before or after the stage of forming the aqueous dispersion, or before and during and after this stage, or before and during this stage, or during and after this dispersion stage.

The oxidizing agent preferred for the four treatment options is always $H_2O_2$ in aqueous solution (15-60%) at a level of $H_2O_2$ ranging from 0.05 to 5% and preferably from 0.05 to 2%, and more preferably from 0.05 to 1.5%, and more preferably still of 0.1 to 1% by weight with respect to the alkyd resin.

The stage of forming the aqueous dispersion according to the invention can, for an acid number of at least 40 mg KOH/g of resin, be obtained by self-emulsification of the alkyd resin, after at least partial neutralization of carboxyl functional groups of the alkyd resin. For an acid number much lower than 40 mg KOH/g of resin, this self-emulsification stage can be combined with, or preferably can be replaced by, a stage of dispersion in the presence of at least one surfactant. This surfactant can be selected from ionic surfactants (in this case preferably anionic surfactant), and/or nonionic surfactants and/or mixed surfactants (comprising, in the same molecule, a nonionic structure and an anionic structure). The preferred surfactant comprises at least one surfactant selected from nonionic surfactant, and possibly in combination with at least an anionic surfactant. The presence of the surfactant improves the stability of the particles during the treatment (if it takes place during and/or after dispersion) and during the storage and use of the final aqueous dispersion. The surfactants are preferably added before the oxidizing treatment, in order to improve the homogeneity of the reaction mixture. One criterion for selection of the surfactant or surfactants used is the HLB (Hydrophilic-Lipophilic Balance) index representing the ratio between the hydrophilic nature and the hydrophobic nature of the surfactant. The HLB can be chosen according to the level by weight of fatty acid (FAL) in the alkyd resin. According to this choice, the HLB of the chosen surfactant varies inversely with respect to the variation in the FAL.

Mention may be made, among suitable anionic surfactants, of the sodium, lithium, potassium, ammonium or magnesium salts derived from alkyl ether sulphates with alkyl varying from $C_8$ to $C_{12}$, or $C_{12}$ alkyl sulphates, alkyl phosphate esters or dialkyl sulphosuccinates. The anionic surfactants are preferably used with at least one nonionic surfactant. Mention may be made, as example of mixed surfactants, of alkoxylated alkylphenol sulphonates. The nonionic surfactants can be used alone but preferably in combination with an anionic surfactant. Mention may be made, as preferred examples of suitable nonionic surfactants, of: ethoxylated (2 to 35 EO) $C_{12}$-$C_{18}$ fatty alcohols, ethoxylated (2-40 EO) iso-$C_{10}$ fatty alcohols, ethoxylated (2-40 EO) monobranched $C_{10}$-$C_{18}$ fatty alcohols, $C_{18}$ sorbitol esters, ethoxylated (5-20 EO units) sorbitol esters, or ethoxylated (7-100 EO) $C_{12}$-$C_{18}$ fatty acids, ethoxylated (30-40 EO) $C_{18}$ castor oil, ethoxylated (7-60 EO) hydrogenated $C_{18}$ castor oil, or fatty esters, such as: glyceryl palmitate, glyceryl stearate, ethylene glycol stearate, diethylene glycol stearate, propylene glycol stearate, polyethylene glycol 200 stearate or ethoxylated (2-15 EO) $C_{18}$ fatty ester.

The preferred aqueous dispersion comprises at least one nonionic surfactant optionally in combination with at least one anionic surfactant, at an overall level by weight ranging from 5 to 15%, preferably from 7 to 12%, with respect to the said alkyd resin, and if anionic surfactants are used with a preferred ratio by weight of ionic to nonionic ranging from 25/75 to 50/50.

The aqueous dispersion according to the invention can comprise at least one other polymer or at least one other resin added after the forming of the dispersion, the said addition being carried out by simple mixing with: at least one other emulsion of polymer which is compatible, such as acrylic or styrene-acrylic or vinyl, or with at least one aqueous dispersion of polyurethane which is compatible or with at least one compatible aqueous dispersion of at least one (meth)acrylic acid copolymer or of at least one maleic anhydride copolymer, it being possible for these copolymers to be at least partially esterified (grafted) by fatty alcohols which can comprise drying unsaturations.

The aqueous dispersion according to the invention can also be obtained by mixing at least two dispersions after treatment, as are defined above according to the invention, or by mixing at least one dispersion according to the invention with at least one other aqueous dispersion of untreated alkyd resin.

The second subject-matter of the invention relates to a process for the preparation of an aqueous dispersion defined according to the invention, which comprises at least the following stages:
 a) oxidizing treatment, before and/or during and/or after the stage of forming the dispersion, of at least one alkyd resin, having a level by weight of conjugated unsaturated fatty acid of at least 5% with respect to the alkyd resin total, with at least one oxidizing agent selected from: hydroperoxides, including $H_2O_2$, peroxides or singlet oxygen, and at a temperature ranging:
  i) from ambient temperature to less than 100° C. and preferably from 50 to 90° C., when the said oxidizing treatment takes place after the stage of forming the aqueous dispersion, and
  ii) from 50 to 150° C., and preferably from 50 to 140° C., and more preferably from 70 to 120° C., and more preferably still of 70 less than 100° C., when the said oxidizing treatment takes place before the stage of forming the aqueous dispersion, and
  iii) from 50 to less than 100° C. and preferably from 50 to 90° C., when the said treatment takes place during the stage of forming the aqueous dispersion and more specifically before the stage of phase inversion,
 b) aqueous dispersion of the said alkyd resin before or during or after the oxidizing treatment.

According to a preferred form, the level by weight of conjugated unsaturated fatty acid with respect to the total of the said alkyd resin is at least 10% by weight and the oxidizing agent is selected from: hydroperoxides of general formula ROOH with R chosen from H, alkyls or aralkyls and with a level by weight ranging from 0.05 to 5% and preferably from 0.05 to 2%, and more preferably from 0.05 to 1.5%, and more preferably still of 0.1 to 1%, with respect to the total of the said resin. According to a more particular embodiment of this process, the level by weight of conjugated unsaturated fatty acid is from 10 to 60% and preferably from 15 to 50%, and more preferably from 20 to 50%, and the total level by weight of fatty acid is from 30 to 70%, and more preferably from 30 to 60%, with respect to the said resin with the level by weight of conjugated unsaturated fatty acid with respect to the fatty acid total being able to vary from 15 to 85% and preferably from 25 to 70%, and more preferably from 35 to 70%.

The following preferred additional characteristics can be associated with the aqueous dispersion obtained by this process: the dispersion has a mean particle size ranging from 50 to 500 nm and preferably from 100 to 300 nm with a solids content ranging from 30 to 70%, and more preferably from 40 to 60%. According to a preferred embodiment, the stage of the oxidizing treatment is carried out using an aqueous $H_2O_2$ solution comprising 15 to 60% and preferably comprising 25 to 45% of $H_2O_2$. The duration of the oxidizing treatment can vary according to the level of oxidizing agent and according to the temperature of the treatment and can range from 5 minutes to 5 hours. Preferably, in the case of $H_2O_2$, this duration can vary from 5 minutes to 2 hours and more preferably from 10 minutes to 1 hour.

An alternative form of this process comprises a neutralization stage which can be prior or subsequent to that of the oxidizing treatment. The stage of the neutralization always takes place before that of the forming of the dispersion.

According to another alternative form of this process, the stage of aqueous dispersion of the alkyd resin is carried out after at least partial neutralization of the carboxyl functional groups of the alkyd resin.

According to another form, the neutralization can take place after the oxidizing treatment and before the stage of forming the aqueous dispersion. A pH adjustment is possible after the stage of forming the dispersion in order to meet the particular specifications required by the applicational formulations. The neutralization stage is carried out with a neutralizing agent which can be selected from: alkali metal hydroxide, such as LiOH, KOH or NaOH, or amines, such as ammonia, triethylamine, diethanolamine or aminomethylpropanol.

The process of the invention can comprise a selfemulsification stage, situated after the stage of at least partial neutralization of the carboxyl groups of the alkyd resin, in particular if the latter has an acid number of at least 40. For an acid number much lower than 40 mg KOH/g of resin, this selfemulsification stage can be combined with, or preferably can be replaced by, a stage of dispersion in the presence of at least one surfactant. Preferably, the dispersion stage according to this process is carried out in the presence of at least one surfactant selected from ionic surfactants, preferably anionic surfactants, and/or nonionic surfactants or mixed surfactants, as defined above.

According to a first embodiment of the treatment stage, the latter takes place, at a temperature ranging from ambient temperature to less than 100° C., preferably 50 to 90° C., after the forming of the aqueous dispersion and after a stage of neutralization of the alkyd resin which takes place before the stage of forming the aqueous dispersion. An early adjustment of pH is desired before the addition of $H_2O_2$ to the dispersion in order to compensate for the relative fall in pH resulting from this addition, this being the case in order to provide better stability to the dispersion.

According to a second embodiment of the stage of the oxidizing treatment, the latter takes place directly on the alkyd resin, before the stage of forming the aqueous dispersion and at a temperature ranging from 50 to 150° C., and preferably from 50 to 140° C., and more preferably from 70 to 120° C., and more preferably still of 70 less than 100° C. By definition, this stage takes place before the stage of the forming of the aqueous dispersion and preferably before a neutralization stage and after the final stage of preparation of said alkyd resin.

A third embodiment of the process with respect to the oxidizing treatment consists in carrying out this treatment during the stage of forming the dispersion and more specifically before the stage of phase inversion, at a treatment temperature ranging from 50 to less than 100° C. and preferably from 50 to 90° C.

A fourth embodiment of the process with respect to the oxidizing treatment consists in producing a combination of at least two embodiments from the preceding three described. This means, according to this fourth embodiment of the process, that the oxidizing treatment can take place, with respect to the stage of forming the dispersion: either before and after, or before and during, or during and after, or before and during and after.

The stage of the forming of the aqueous dispersion is carried out in the presence of a surfactant and according to a process of phase inversion (cf. Multiphase Science and Technology, Vol. 12, pp. 51-116, 2000—Phase Inversion and Associated Phenomena—L. Y. Yeo, O. K. Matar, E. S. Perez de Ortiz, G. F. Hewitt) and by using, as dispersion means, either a mechanical disperser with an effective homogenizing effect or an ultrasound generator device.

According to an alternative form, the process for the preparation of the aqueous dispersion according to the invention can comprise, after the stage of forming the aqueous dispersion, an additional stage which consists of a simple mixing, with stirring, to homogenize at least one aqueous dispersion as defined according to the invention with at least one other aqueous dispersion or emulsion of polymer or of resin which is compatible chosen from: emulsion of at least one polymer, such as acrylic or styrene-acrylic or vinyl polymer, or aqueous dispersion of at least one polyurethane or of at least one (meth)acrylic acid copolymer or of at least one maleic anhydride copolymer, it being possible for the said copolymers to be at least partially neutralized or esterified by fatty alcohols, which fatty alcohols can comprise drying unsaturations.

A final alternative form of the process according to the invention can comprise, after the stage of forming the aqueous dispersion, an additional stage which is a simple mixing of at least two dispersions as defined according to the invention, or of at least one dispersion according to the invention with at least one other dispersion of alkyd resin not treated according to the treatment of the invention.

The third subject-matter of the invention is the aqueous dispersion, having a mean particle size ranging from 50 to 500 nm and preferably from 100 to 300 nm and a solids content ranging from 30 to 70%, and preferably from 40 to 60%, of at least one alkyd resin which can be obtained according to at least one embodiment of the process of the invention as defined above.

The fourth subject-matter of the invention relates to an aqueous coating composition comprising, as binder, at least one aqueous dispersion of alkyd resin as defined according to the invention. The coating is selected from: decorative or industrial aqueous paints or varnishes. These aqueous coating compositions and in particular the paints and varnishes have the additional advantage, with respect to the conventional compositions, of having a reduced level of drying agent for a significantly reduced drying time or the complete absence of drying agent for a controlled drying time acceptable for the final applications, with the environment being respected.

A fifth subject-matter of the invention relates to the use of an aqueous dispersion according to the invention in decorative or industrial aqueous coatings, including corrosion-resistant coatings for metals, for substrates selected from: wood, metal, plastic, concrete, plaster, ceramic, brick or composite. The coating compositions formulated from an aqueous dispersion according to the invention can comprise a reduced level of at least one drying agent and preferably do not comprise any thereof. The advantage of the rapid drying of the coating compositions based on the aqueous dispersions according to the invention, related also to the advantage of the reduction as far as the absence of drying agent, makes possible the use of these dispersions in specific applications where the need for rapid drying (<6 H) is essential in order to be able to apply at least one second coat on the same day. Likewise, slightly greater coating thicknesses would be allowed for a shorter drying time.

The final subject-matter of the invention relates to substrates coated with at least one of the coating compositions as defined above and comprising at least one aqueous dispersion of alkyd resin according to the invention. Preferably, these coated substrates do not comprise any residue of a drying agent based on heavy metals, such as cobalt, manganese, vanadium, zirconium, calcium, barium, lithium, lead, strontium, cerium, zinc and iron, commonly used in conventional coatings. The dispersions of the invention and the coatings which result therefrom are thus favourable in respecting the environment, while having the other applicational performance aspects at least identical, if not improved, with respect to the conventional aqueous coatings.

By way of illustration of the invention, the following examples demonstrate, without any limitation, the performances of the dispersions and coatings obtained.

I) Starting Materials Used:
  a) Acids:

| | Commercial reference | Supplier | Acid number (mg KOH/g) | Level of conjugated diene fatty acid (%) | Level of non-conjugated unsaturated fatty acid (%) | Iodine number (cg $I_2$/g) 1 cg = $10^{-2}$ g |
|---|---|---|---|---|---|---|
| Tall oil fatty acid | Sylfat ® 2 | Arizona Chemicals | 192-195 | 6 | 90 | 148-155 |
| Sunflower oil fatty acid | Nouracid ® HE30 | Uniqema | 198-202 | 0 | 83 | 130-146 |
| Conjugated dehydrated castor oil fatty acid | Dedico 5981 | Uniqema | 193-198 | 60-65 | 28-39 | 163-173 |
| Isomerized sunflower oil fatty acid | Nouracid HE305 | Akzo Nobel | 202 | 52.7 | 34.9 | 136 |
| Benzoic acid | / | DSM Special Products | 459.5 | / | / | / |
| Phthalic anhydride | / | BASF | 757.1 | / | / | / |
| Hypophosphorous acid (50% in water) | / | Merck Eurolab/Prolabo | / | / | / | / | b) Polyols:

| | Supplier | Nature |
|---|---|---|
| Pentaerythritol | Perstorp | polyol | c) Bulk alkyd Resins Before Treatment/Dispersion:

The resin α is a conventional alkyd resin for dispersion. It constitutes a comparative example with respect to the resin β according to the invention. The resin γ constitutes a comparative example according to U.S. Pat. No. 2,981,703, Ex. 1-C2-L57 to C3-L1. The resin δ is another example according to the invention.

| Bulk resin reference | α (comp.) | β | γ (comp.) | δ |
|---|---|---|---|---|
| Process | cf. III | cf. III | U.S. Pat. No. 2 981 703 (*) Ex. 1-C2-L57 to C3-L1 | cf. III |
| Tall oil fatty acid | 174.59 | / | (*) | / |
| Sunflower oil fatty acid | 174.59 | / | | / |
| Dedico 5981 | / | 348.06 | | / |
| Nouracid HE305 | / | / | | 345.12 |
| Pentaerythritol | 221.94 | 229.24 | | 227.08 |
| Benzoic acid | 174.59 | 180.03 | | 178.42 |
| Phthalic anhydride | 254.04 | 242.44 | | 240.14 |
| Hypophosphorous acid | 0.25 | 0.23 | | 0.23 |
| Level of conjugated unsaturated fatty acid/resin (%) | 1.13 | 22.6 | 0 | 19.8 |
| Total level of fatty acid/resin (%) | 37.8 | 37.1 | 46.8 | 37.6 |
| Solids content (%) (1 g, 1 h, 125° C.) | >99 | >99 | >99 | >99 |
| Viscosity (Noury, 110° C., mPa · s) | 3950-5300 | 3950-5300 | | 3980 |
| Acid number $I_A$ (mg KOH/g) | 9-14 | 18-22 | 62 | 19.6 |
| Hydroxyl number $I_{OH}$ (mg KOH/g) | 34-40 | 54-60 | 229 | 65 |
| Functionality f | 2.03 | 1.98 | 1.94 | 1.98 |
| Mw | 23000-27000 | 17000-25000 | / | / | f: functionality of the resin: $f = 2 \Sigma_i n_i f_i / M$
$n_i$ and $f_i$ respectively being the numbers of moles and the functionalities of the (poly)acid and M the total number of moles
$I_A$ (mg KOH/g): Acid number, expressed in mg KOH/g
$I_{OH}$ (mg KOH/g): Hydroxyl number, expressed in mg KOH/g d) Other Additives:

| | Supplier | Nature/Function |
|---|---|---|
| LiOH monohydrate | VWR International (Prolabo) | Neutralizing agent (diluted to 10% in water) |
| Ethoxylated (41 EO) iso-$C_{10}$ alcohol: HLB = 18.3 | / | Nonionic surfactant |
| Ethoxylated (31 EO) monobranched fatty alcohol: HLB = 17.4 | / | Nonionic surfactant |
| $H_2O_2$ diluted to 30% in water | VWR International (Prolabo) | $H_2O_2$ diuted to 30% in water |
| Acticide ® SPX | Thor Chemie | Biocide (formulation based on 2-methyl-4-isothiazolin-3-one and 5-chloro-2-methyl-4-isothiazolin-3-one) |
| Dispex ® N40 | Ciba Speciality Chemicals | Dispersing agent (Sodium polyacrylate) |
| Byk ® 024 | Byk Chemie | Antifoaming agent (mixture of polysiloxanes) |
| Durham Co ® 10WM | Elementis Specialities | Drying agent based on cobalt carboxylate |
| Acrysol ® RM2020 | Rohm & Haas | Nonionic urethane thickener (HEUR) |
| Acrysol ® RM8W | Rohm & Haas | Nonionic urethane thickener (HEUR) |
| Tioxide ® RHD2 | Huntsman Tioxide | Titanium dioxide |

II) Test Methods:

1) Solids Content:

Evaluation according to ISO 3251 according to the conditions: 1 g, 1 h, 125° C., and expressed in %.

2) Viscosity:

Evaluation of the Noury viscosity at 110° C. on bulk resin according to Standard AFNOR XPT 51213 and expressed in mPa·s.

Evaluation of the Brookfield viscosity at 23° C., 10 rpm, using the 2 and 3 spindles on a Brookfield RVDVE-230 viscometer according to Standard ISO 2555.

3) Particle Size:

Particle size measured using a device of Zetasizer type—Malvern Instruments Ltd. The sample of dispersion is diluted in a transparent vessel using filtered deionized water and the size of the particles is measured by 90° laser scattering.

4) Acid Number and Hydroxyl Number:

Acid number evaluated according to Standard ISO 3682. Hydroxyl number evaluated according to Standard NFT 30-403.

5) Iodine Number:

Evaluated according to Standard NFT 60-203.

6) Drying Time:

The drying times are evaluated using a 3-speed BK drying time recorder (6 h, 12 h, 24 h) known to a person skilled in the art, the instructions for which give the method of evaluation. Device manufactured by The Mickle Laboratory Engineering Co. Ltd., Goose Green, Gomshall, Guildford, Surrey, GU5 9LJ, UK.

The measurements of the drying time, in particular at the core, are taken on a wet film with a thickness of 75 µm applied with a hand coater for various drying times. Each series of samples is evaluated in comparison with a reference sample.

7) Hardness:

The hardness is evaluated using a Persoz hardness pendulum, on films with a wet thickness of 100 µm applied to glass sheets, after various drying times and according to Standard ISO 1522.

8) Yellowing:

Device of the "Dr Lange" Micro Color LMC Spectrocolorimeter type.

Measurements of the yellowing index Yi according to Standard ASTM D1925 on dry films with various drying times.

The films with a wet thickness of 150 µm are applied to Leneta charts using a Bird film applicator.

9) Gloss:

The measurements are taken using a BYK Gardner GmbH micro-TRI-gloss glossmeter at 20° and 60°, after various drying times for wet films with a thickness of 200 µm deposited on glass sheets, and according to Standard ISO 2813.

10) Dynamic Elastic Modulus:

The dynamic elastic modulus E' is evaluated by DMTA (Dynamic Mechanical Thermal Analysis) using a Rheometric Solid Analyser rheometer (RSAII) at a frequency of 1 Hz with a temperature rise gradient of 5° C. per minutes from −100° C. to +250° C. on a film with a wet thickness of 500 µm for various drying times at 23° C., 50%±5% relative humidity.

III) Preparation and Evaluation of the Dispersions:

1) Process for the Preparation of the Bulk Resin Before Treatment/Dispersion:

The various constituents are heated while bubbling nitrogen through, the esterification reaction taking place between 230 and 250° C., according to a fusion process known to a person skilled in the art so that the resin has the characteristics defined in Table I-c).

2) Dispersion of the Bulk Resin:

The resin to be dispersed is heated to between 60 and 100° C.

The surfactant is added and the mixture is stirred while retaining the same temperature, then LiOH (10%), the neutralizing agent, is added while continuing to stir. After 10 min, the deionized water is gradually added. Generally, before the inversion, when a water-in-oil emulsion is formed, the viscosity of the mixture is fairly high. This is why vigorous stirring is necessary in order to obtain good mixing of the components. Finally, the biocide is added and the solids content and the pH, if necessary, are adjusted.

3) Treatment with $H_2O_2$:

a) Oxidation Treatment Before Dispersion of the Resin:

Depending on the circumstances, the resin is heated to the treatment temperature (between 60 and 150° C.). After addition of the surfactant, $H_2O_2$ is gradually added while continuing to stir and while maintaining the temperature. Neutralization is subsequently carried out at a temperature of less than 100° C. The resin thus treated is subsequently dispersed, still at a temperature of less than 100° C.

In another method of treatment, when the oxidizing treatment is carried out at a temperature of less than 100° C., the neutralization can be carried out before the oxidizing treatment.

b) Oxidizing Treatment After Dispersion:

Once the resin has been dispersed and prepared according to III 2), the addition of $H_2O_2$ is carried out gradually at a temperature of between 60 and 100° C. with stirring. After the addition, the emulsion is slowly cooled to ambient temperature.

4) Composition of the Dispersions:

TABLE 1a

Composition of the dispersions

| | Ex. 1 (comp.) | Ex. 2 (comp.) | Ex. 3 (comp.) | Ex. 4 | Ex. 5 | Ex. 6 (comp.) | Ex. 7 (comp.) | Ex. 8 | Ex. 9 | Ex. 10 (comp.) | Ex. 11 |
|---|---|---|---|---|---|---|---|---|---|---|---|
| Resin α | 456.6 | 456.6 | / | / | / | / | Resin γ*** Neutralization with ammonia before dispersion | / | / | / | / |
| Resin β | / | / | 462.46 | 462.46 | 462.46 | ** | | 462.46 | 462.46 | / | / |
| Resin γ | / | / | / | / | / | / | | / | / | / | / |
| Resin δ | / | / | / | / | / | / | | / | / | 462.46 | 462.46 |
| Ethoxylated (31 EO) monobranched fatty alcohol*: HLB = 17.4 | 41.1 | 41.1 | / | / | / | / | | / | / | / | / |
| Ethoxylated (41 EO) iso-$C_{10}$ alcohol*: HLB = 18.3 | / | / | 41.62 | 41.62 | 41.62 | / | | 41.62 | 41.62 | 41.62 | 41.62 |
| $H_2O_2$ (30%) | 0 | 15.22 | 0 | 7.71 | 15.42 | 0 | | 15.42 | 15.42 | 0 | 15.42 |
| LiOH (10%) | 17.2 | 17.2 | 5.92 | 5.92 | 5.92 | / | | 5.92 | 5.92 | 5.92 | 5.92 |

TABLE 1a-continued

| | \multicolumn{11}{c}{Composition of the dispersions} | | | | | | | | | | |
|---|---|---|---|---|---|---|---|---|---|---|---|
| | Ex. 1 (comp.) | Ex. 2 (comp.) | Ex. 3 (comp.) | Ex. 4 | Ex. 5 | Ex. 6 (comp.) | Ex. 7 (comp.) | Ex. 8 | Ex. 9 | Ex. 10 (comp.) | Ex. 11 |
| Deionized water | 484.1 | 484.1 | 489 | 489 | 489 | / | | 489 | 489 | 489 | 489 |
| Acticide SPX | 1 | 1 | 1 | 1 | 1 | / | | 1 | 1 | 1 | 1 |

*NIS: Nonionic surfactant
**the resin used in Example 6 is resin β; it could not be emulsified since it gelled after 2.5 h of oxidation treatment with atmospheric oxygen.
***Cf U.S. Pat. No. 2 981 703, Ex. 1-C2 L57 to C3 L1

5) Process for Producing the Dispersions:

TABLE 1b

| | \multicolumn{11}{c}{Process for producing the dispersions (specific conditions)} | | | | | | | | | | |
|---|---|---|---|---|---|---|---|---|---|---|---|
| | Ex. 1 (comp.) | Ex. 2 (comp.) | Ex. 3 (comp.) | Ex. 4 | Ex. 5 | Ex. 6(*) (comp.) | Ex. 7 (comp.) | Ex. 8 | Ex. 9 | Ex. 10 (comp.) | Ex. 11 |
| Level of pure $H_2O_2$/resin (%) | 0 | 1 | 0 | 0.5 | 1 | 0 | 5 | 1 | 1 | 0 | 1 |
| Treatment before/after dispersion | | before | | before | before | *$O_2$ before | before | before | after | | before |
| Treatment duration (min) | | 45 | | 45 | 45 | Gel after 150 | 60 | 30 | 30 | | 45 |
| Temperature of oxidizing treatment (° C.) | | 75 | | 75 | 75 | 120 | 150-160 | 100 | 75 | | 75 |
| Neutralization before/after treatment | | before | | before | before | / | | after | after | before | before |

*according to U.S. Pat. No. 3 222 308, C9-L53-56, Ex. III: treatment with $O_2$

6) Essential Characteristics of the Dispersions:

TABLE 1c

| | \multicolumn{11}{c}{Essential characteristics of the dispersions} | | | | | | | | | | |
|---|---|---|---|---|---|---|---|---|---|---|---|
| | Ex. 1 (comp.) | Ex. 2 (comp.) | Ex. 3 (comp.) | Ex. 4 | Ex. 5 | Ex. 6 (comp.) | Ex. 7 (comp.) | Ex. 8 | Ex. 9 | Ex. 10 (comp.) | Ex. 11 |
| Brookfield viscosity (mPa·s) | 92 | 145 | 4176 | 2153 | 816 | Gel after 150 min | / | 992 | 184 | 1220 | 1350 |
| Solids content ISO 3251 | 50.5 | 51.6 | 50.9 | 50.1 | 51.2 | | 40 | 51.0 | 49.2 | 50.6 | 50.7 |
| Particle size (Zetasizer) (nm) (cf. II-3) | 210 | 195 | 112 | 135 | 147 | | / | 170 | 113 | 145 | 157 |

(comp.): comparative examples.
The other examples are according to the invention.

7) Dynamic Elastic Modulus of the Dry Films of Dispersions:

The films with a wet thickness of 500 μm (cf. II-10) are applied to polypropylene sheets from dispersions which may or may not have had added a cobalt-based drying agent of Durham Co 10WM type.

| Sample | Conjugated fatty acid | Co/bulk resin | $H_2O_2$ | E' (MPa) 50 days |
|---|---|---|---|---|
| Ex. 1 + 0.1% Co* (comp.) | no | 0.1% | 0% | 0.48 |
| Ex. 5 | yes | 0% | 1% | 1.54 |

*0.1% by weight of cobalt with regard to dry binder (= 100 g Ex. 1 + 0.5 g Durham Co 10WM)

The dynamic elastic modulus E' at the plateau is an indicator of the degree of crosslinking of the film in its entirety.

IV) Preparation of the Paint Formulations Based on the Aqueous Dispersions and Performances of the Films:

The performances of the alkyd dispersions described above are evaluated on films applied from gloss paint formulations. A cobalt-based drying agent (Durham Co 10WM, Elementis Specialities) is added in the comparative examples in order to show the performances with and without drying agent.

General Procedure for Formulation of the Paints:

A large portion of the water is poured into a container equipped with a cooled jacket and the biocide, the dispersing agent, the antifoaming agent, the titanium dioxide and a portion of the high-shear-gradient thickener are subsequently added with slow stirring. The disperser (Dispermat® CV) speed is then adjusted so as to obtain optimum dispersion. Dispersion is carried out for 20 minutes. The mill base thus prepared is subsequently incorporated in the alkyd dispersion, which may or may not be mixed with the drying agent. The thickeners are subsequently added to adjust the rheology.

TABLE 2

Composition of the formulations Formulation 1:

| Component/Reference | Function | Parts by weight |
|---|---|---|
| Water | | 83.65 |
| Acticide SPX | Biocide | 1.5 |
| Dispex N40 | Dispersing agent | 1.55 |
| Byk 024 | Antifoaming agent | 1.3 |
| Tioxide RHD2 | Titanium dioxide | 258 |
| Alkyd dispersion (with a solids content of 50%) | Binder | 633 |
| Durham CO 10WM | Cobalt-based drying agent | 0 or 2.8 |
| Acrysol RM2020 | High-shear-gradient thickener | 18 |
| Acrysol RM8W | Low-shear-gradient thickener | 3 |

Calculated Characteristics of the Formulation No. 1 (Without Drying Agent):
PVC=18.8%
Solids content by weight=approximately 58%
Solids content by volume=approximately 45%

V) Performances of the Paint Films:

The thickness of the film and its method of application vary according to the test desired.

For each measurement, reference should be made to the corresponding test method in Section II.

TABLE 3

Performances of the films of paints based on aqueous alkyd dispersions

| Dispersion | A Ex. 1 | B Ex. 2 | C Ex. 2 | D Ex. 3 | E Ex. 4 | F Ex. 5 | G Ex. 4 | H Ex. 5 | I Ex. 8 | J Ex. 7 | K Ex. 9 | L Ex. 10 | M Ex. 11 | N Ex. 11 |
|---|---|---|---|---|---|---|---|---|---|---|---|---|---|---|
| Presence of conjugated fatty acids | no | no | no | yes | yes | yes | yes | yes | yes | no | yes | yes | yes | yes |
| Level of $H_2O_2$ % | 0 | 1 | 1 | 0 | 0.5 | 1 | 0.5 | 1 | 1 | 5 | 1 | 0 | 1 | 1 |
| Paint formulation | No. 1 | No. 1 | No. 1 | No. 1 | No. 1 | No. 1 | No. 1 | No. 1 | No. 1 | No. 1 | No. 1 | No. 1 | No. 1 | No. 1 |
| Presence of drying agents | yes | yes | no | yes | yes | yes | no | no | no | no | no | yes | yes | no |
| Core drying time (h) BK 12 h | 8 | 5 | >12 | 6 | 3 | 2 | 7 | 4 | 4 | >12 | 4.5 | 7 | 2.5 | 4.5 |
| Persoz hardness (s) | | | | | | | | | | | | | | |
| 1 day | 65 | 71 | 54 | 55 | 63 | 57 | 37 | 38 | | | | 40 | 48 | 37 |
| 4 days | 139 | 129 | 85 | 120 | 103 | 114 | 78 | 81 | | | | 71 | 81 | 55 |
| 7 days | 145 | 137 | 89 | 156 | 142 | 150 | 104 | 107 | | | | 103 | 85 | 57 |
| 14 days | 167 | 167 | 106 | 175 | 155 | 168 | 110 | 121 | | | | 121 | 110 | 67 |
| Yellowing Yi | | | | | | | | | | | | | | |
| After 24 h | 8.6 | 9.5 | 9.1 | 8.1 | 9.7 | 9.7 | 8.6 | 8.8 | | | | 6.3 | 8.7 | 8.6 |
| After 1 week/23° C./50 ± 5% RH | 9.4 | 10.7 | 9.7 | 9.7 | 10.5 | 9.9 | 8.8 | 9.6 | | | | 9.5 | 10.2 | 9.1 |
| After 2 weeks/23° C./50 ± 5% RH | 9.9 | 10.8 | 10.2 | 9.9 | 11 | 10 | 9.4 | 10.2 | | | | 9.4 | 10.4 | 9.8 |
| After 1 week/oven at 50° C. | 13 | 13.1 | 12 | 10.6 | 12 | 12 | 10.7 | 10 | | | | 10.7 | 11.4 | 9.9 |
| After 2 weeks/oven at 50° C. | 15 | 14.9 | 14 | 13.5 | 13.4 | 13.5 | 12.7 | 11.9 | | | | 12.4 | 12.9 | 11.9 |
| Gloss (%) | | | | | | | | | | | | | | |

TABLE 3-continued

Performances of the films of paints based on aqueous alkyd dispersions

| Dispersion | A Ex. 1 | B Ex. 2 | C Ex. 2 | D Ex. 3 | E Ex. 4 | F Ex. 5 | G Ex. 4 | H Ex. 5 | I Ex. 8 | J Ex. 7 | K Ex. 9 | L Ex. 10 | M Ex. 11 | N Ex. 11 |
|---|---|---|---|---|---|---|---|---|---|---|---|---|---|---|
| After 24 h | | | | | | | | | | | | | | |
| 20° | 88.8 | 87.1 | 88 | 88.9 | 87.4 | 84 | 88.9 | 87.9 | | | | 89.7 | 87.1 | 90.6 |
| 60° | 95.8 | 95.6 | 95.3 | 96.2 | 95.8 | 94 | 95.8 | 95.2 | | | | 95.9 | 94.3 | 95.3 |
| After 2 weeks/23° C./50 ± 5% RH | | | | | | | | | | | | | | |
| 20° | 81.4 | 80.1 | 85.2 | 86.3 | 79.2 | 73.7 | 84.9 | 81.9 | | | | 82.4 | 82.2 | 84.3 |
| 60° | 92.4 | 92.6 | 92.9 | 95 | 92.2 | 90.7 | 93.3 | 93.1 | | | | 91 | 93.1 | 91.7 |
| After 2 weeks/oven at 50° C. | | | | | | | | | | | | | | |
| 20° | 66.8 | 66.6 | 84.3 | 65 | 76.9 | 64.6 | 85 | 81.9 | | | | 81.1 | 75.5 | 82 |
| 60° | 87.1 | 89.3 | 92.7 | 89.2 | 92.4 | 88.1 | 93.7 | 93.1 | | | | 92.6 | 90.1 | 89.5 |

The invention claimed is:

1. Aqueous dispersion comprising at least one alkyd resin, characterized in that said alkyd resin is obtained from at least one conjugated unsaturated fatty acid representing, by weight, at least 5% of the said resin and in that the said resin is treated, before and/or during and/or after the forming of the aqueous dispersion, with at least one oxidizing agent selected from: hydroperoxides, including $H_2O_2$, peroxides or singlet oxygen, and in that the temperature of the oxidizing treatment is:
   (i) from ambient temperature to less than 100° C., when it takes place after the forming of the aqueous dispersion, and
   ii) from 50 to 150° C., when it takes place before the forming of the aqueous dispersion, and
   iii) from 50 to less than 100° C., when the treatment takes place during the aqueous dispersion stage,
   and in that the mean particle size is ranging from 50 to 500 nm and that the solid contents is ranging from 30 to 70%; and without gelling of the treated alkyd resin.

2. Aqueous dispersion according to claim 1, characterized in that the level of conjugated unsaturated fatty acid in the said resin is at least 10% by weight and in that the said oxidizing agent is selected from: hydroperoxides of general formula ROOH, with R chosen from H, alkyls or aralkyls, and with a level ranging from 0.05 to 5% by weight with respect to the total of the said resin.

3. Aqueous dispersion according to claim 1, characterized in that the level of conjugated unsaturated fatty acid is from 10 to 60% by weight and in that the total level of fatty acid is from 30 to 70% by weight with respect to the said resin, with a level by weight of conjugated unsaturated fatty acid with respect to the fatty acid total varying from 15 to 85%.

4. Dispersion according to claim 1, characterized in that the said hydroperoxide is chosen from: $H_2O_2$, cumyl hydroperoxide or t-butyl hydroperoxide, and preferably aqueous $H_2O_2$.

5. Dispersion according to claim 1, characterized in that the said oxidizing treatment takes place in the absence of any drying agent.

6. Aqueous dispersion according to claim 1 characterized in that the said alkyd resin, before the oxidizing treatment, has a weight-average molecular mass Mw ranging from 10 000 to 500 000 and an acid number less than 70, an OH number ranging from 20 to 150 and a mean functionality f ranging from 1.9 to 2.1.

7. Aqueous dispersion according to claim 1, characterized in that the said conjugated unsaturated fatty acid is the isomerization product of unsaturated fatty acids chosen from linoleic acid, linolenic acid, sunflower oil fatty acid, linseed oil fatty acid or soybean oil fatty acid or the dehydration product of castor oil fatty acid.

8. Aqueous dispersion according to claim 1, characterized in that the acid component from which the said resin is obtained comprises, in addition to the conjugated unsaturated fatty acid, at least one other non-conjugated unsaturated fatty acid, at least one saturated fatty acid, at least one polycarboxylic acid or corresponding anhydride derivative, and at least one non-fatty monocarboxylic acid.

9. Aqueous dispersion according to claim 1, characterized in that the oxidizing agent is $H_2O_2$ in aqueous solution at a concentration ranging from 15 to 60% by weight with respect to the aqueous solution and at a level of 0.05 to 2% by weight with respect to the said alkyd resin.

10. Aqueous dispersion according to claim 1, characterized in that the oxidizing treatment takes place after the stage of forming the aqueous dispersion of the said alkyd resin, at a treatment temperature of less than 100° C.

11. Aqueous dispersion according to claim 1, characterized in that the oxidizing treatment-takes place before the forming of the dispersion directly-on-the alkyd resin, at a temperature ranging from 50 to 150° C.

12. Aqueous dispersion according to claim 1, characterized in that it comprises at least one surfactant selected from ionic surfactants and/or nonionic surfactants and/or mixed surfactants.

13. Aqueous dispersion according to claim 1, characterized in that it comprises at least one nonionic surfactant, and optionally in combination with at least one anionic surfactant at an overall level by weight ranging from 5 to 15%, with respect to the said alkyd resin, and if anionic surfactants are used with a ratio by weight of ionic to nonionic ranging from 25/75 to 50/50.

14. Aqueous dispersion according to claim 1, characterized in that it additionally comprises at least one other polymer or at least one other resin added after the forming of the dispersion, the said addition being carried out by simple mixing with at least one other emulsion of acrylic or styrene-acrylic or vinyl polymer, or with at least one aqueous dispersion of poly-urethane or with at least one (meth)acrylic acid copolymer or of at least one maleic anhydride copolymer which can be at least partially esterified by fatty alcohols which can comprise drying unsaturations.

15. Aqueous dispersion according to claim 1, characterized in that it is a product of the mixing of at least two dispersions as defined according to claim 1 or of at least one dispersion as defined according to claim 1 with at least one other dispersion of untreated alkyd resin.

16. Process for the preparation of an aqueous dispersion defined according to claim 1, characterized in that it comprises at least the following stages:
oxidizing treatment, before and/or during and/or after the stage of forming the dispersion, of at least one alkyd resin, having a level by weight of conjugated unsaturated fatty acid of at least 5% with respect to the alkyd resin total, with at least one oxidizing agent selected from: hydroperoxides, including $H_2O_2$, peroxides or singlet oxygen,
and at a temperature ranging:
from ambient temperature to less than 100° C., when the said oxidizing treatment takes place after the stage of forming the aqueous dispersion, and
from 50 to 150° C., when the said oxidizing treatment takes place before the stage of forming the aqueous dispersion, and
from 50 to less than 100° C., when the oxidizing treatment takes place during the aqueous dispersion stage,
aqueous dispersion of the said alkyd resin before or during or after the oxidizing treatment.

17. Process according to claim 16, characterized in that the level by weight of conjugated unsaturated fatty acid with respect to the total of the said alkyd resin is at least 10% by weight and in that the said oxidizing agent is selected from: hydroperoxides of general formula ROOH, with R chosen from H, alkyls or aralkyls, and with a level by weight ranging from 0.05 to 5% with respect to the total of the said resin.

18. Process according to claim 16, characterized in that the level by weight of conjugated unsaturated fatty acid is from 10 to 60% and in that the total level by weight of fatty acid is from 30 to 70% with respect to the said resin, with a level by weight of conjugated unsaturated fatty acid with regard to the fatty acid total varying from 15 to 85%.

19. Process according to claim 16, characterized in that the said oxidizing treatment is carried out using an aqueous $H_2O_2$ solution comprising 15 to 60% of $H_2O_2$.

20. Process according to claim 16, characterized in that it comprises an additional neutralization stage subsequent or prior to that of the oxidizing treatment.

21. Process according to claim 16, characterized in that the aqueous dispersion of the alkyd resin is produced after at least partial neutralization of the carboxyl functional groups of the alkyd resin.

22. Process according to claim 16, characterized in that the forming of the dispersion is carried out in the presence of at least one surfactant selected from ionic surfactants and/or nonionic surfactants and/or mixed surfactants.

23. Process according to claim 22, characterized in that the surfactant is at least a nonionic surfactant, and possibly in combination with at least one anionic surfactant, at an overall level by weight ranging from 5 to 15%, with respect to the said alkyd resin, and if anionic surfactants are used with a preferred ratio by weight of ionic to nonionic ranging from 25/75 to 50/50.

24. Process according to claim 22, characterized in that said nonionic surfactant is selected from: ethoxylated C12-C18 fatty alcohols with 2 to 35 EO, ethoxylated iso-C10 fatty alcohols with 2-40 EO, ethoxylated C10-C18 monobranched fatty alcohols with 2-40 EO, C18 sorbitol esters, ethoxylated sorbitol esters with 5-20 EO units, or ethoxylated C12-C18 fatty acids with 7-100 EO, ethoxylated castor oil with 30-40 EO, ethoxylated hydrogenated castor oil with 7-60 EO, fatty esters of glyceryl palmitate, glyceryl stearate, ethylene glycol stearate, diethylene glycol stearate, propylene glycol stearate, polyethylene glycol 200 stearate or ethoxylated C18 fatty ester with 2-15 EO.

25. Process according to claim 20, characterized in that the neutralization stage is carried out with a neutralizing agent selected from: alkali metal hydroxide, more particularly LiOH, KOH or NaOH, or amines, more particularly ammonia, triethylamine, diethanolamine or aminomethylpropanol.

26. Process according to claim 16, characterized in that the oxidizing treatment stage is carried out, at a temperature ranging from 50 to 150° C., before the stage of the forming of the aqueous dispersion and before a neutralization stage and after the final stage of preparation of the said alkyd resin.

27. Process according to claim 16, characterized in that the oxidizing treatment stage is carried out, at a temperature ranging from ambient temperature to less than 100°C., preferably 50 to 90° C., after the forming of the aqueous dispersion and after a stage of neutralization of the alkyd resin which takes place before the stage of the forming of the aqueous dispersion.

28. Process according to claim 16, characterized in that the stage of the forming of the aqueous dispersion is carried out in the presence of a surfactant and by a process of phase inversion and by using, as dispersion means, either a mechanical disperser or an ultrasound generator device.

29. Process according to claim 16, characterized in that the oxidizing treatment stage takes place either before and after, or before and during, or during and after, or before and during and after the stage of forming the aqueous dispersion.

30. Process according to claim 16, characterized in that it comprises, after the stage of forming the aqueous dispersion, an additional stage which is a simple mixing, with stirring, in order to homogenize at least one aqueous dispersion as defined according to claim 1 or obtained by the process as defined in claim 16 with at least one other aqueous dispersion or emulsion of polymer or of resin which is compatible chosen from the emulsions of at least one acrylic or styrene-acrylic or vinyl polymer or at least one aqueous dispersion of at least one compatible polyurethane or of at least one (meth) acrylic acid copolymer or of at least one maleic anhydride copolymer, it being possible for the said copolymers to be at least partially neutralized or esterified by fatty alcohols, which fatty alcohols can comprise drying unsaturations.

31. Process according to claim 16, characterized in that it comprises, after the stage of the forming of the aqueous dispersion, an additional stage which is a simple mixing of at least two dispersions as defined in claim 1 or obtained according to the process defined in claim 16 or of at least one dispersion as defined according to claim 1 with at least one other dispersion of untreated alkyd resin.

32. Aqueous dispersion of at least one alkyd resin which is obtained according to the process as defined according to claim 16.

33. Aqueous coating composition comprising, as binder, at least one aqueous dispersion as defined according to claim 1 or as obtained according to the process defined according to claim 16.

34. Composition according to claim 33, characterized in that the said coating is selected from: decorative or industrial aqueous paints or varnishes.

35. Composition according to claim 33, characterized in that it comprises at least one drying agent at a reduced level or, preferably, in that it does not comprise any drying agent.

36. Method of coating, comprising using an aqueous coating composition according to claim 33 in decorative or industrial aqueous coatings, including corrosion-resistant coatings for metal, for substrates selected from: wood, metal, plastic, concrete, plaster, ceramic, brick or composite.

37. Substrates coated with at least one of the coating compositions as defined according to claim 33.

* * * * *